(12) United States Patent
Farid et al.

(10) Patent No.: US 11,198,222 B2
(45) Date of Patent: Dec. 14, 2021

(54) ROBOTIC HEATING APPARATUS AND METHOD

(71) Applicant: SPYCE FOOD CO., Somerville, MA (US)

(72) Inventors: Michael S. Farid, Cambridge, MA (US); Luke S. Schlueter, Allston, MA (US); Braden E. Knight, Allston, MA (US); Kale T. Rogers, Boston, MA (US)

(73) Assignee: SPYCE FOOD CO., Somerville, MA (US)

( * ) Notice: Subject to any disclaimer, the term of this patent is extended or adjusted under 35 U.S.C. 154(b) by 461 days.

(21) Appl. No.: 16/385,911

(22) Filed: Apr. 16, 2019

(65) Prior Publication Data

US 2019/0329419 A1    Oct. 31, 2019

Related U.S. Application Data

(60) Provisional application No. 62/664,568, filed on Apr. 30, 2018.

(51) Int. Cl.
*A47J 36/34* (2006.01)
*B25J 11/00* (2006.01)
(Continued)

(52) U.S. Cl.
CPC ......... *B25J 11/0045* (2013.01); *A47J 27/002* (2013.01); *A47J 27/004* (2013.01);
(Continued)

(58) Field of Classification Search
CPC .. A47J 37/041; A47J 37/1257; A47J 37/1295; A47J 37/10; A47J 36/165; A47J 36/34; A47J 43/046; H05B 6/12
(Continued)

(56) References Cited

U.S. PATENT DOCUMENTS

| 4,060,183 A | 11/1977 | Puurunen |
| 4,066,107 A | 1/1978 | Karp et al. |

(Continued)

FOREIGN PATENT DOCUMENTS

| GB | 2239442 | 3/1991 |
| GB | 2521999 | 7/2015 |

(Continued)

OTHER PUBLICATIONS

PCT/US2017/024821; International Search Report and Written Opinion; dated Jun. 6, 2017; US.
(Continued)

*Primary Examiner* — Reginald Alexander
(74) *Attorney, Agent, or Firm* — Dennis D. Brown; Brown Patent Law, P.L.L.C.

(57) ABSTRACT

A robotic heating and mixing system which automatically warms or cooks and mixes ingredients for a meal or entrée in a heating pot which warms or cooks the ingredients in a manner resembling a wok and is automatically gimbaled between a loading position for loading the ingredients, a cooking and mixing orientation, a serving orientation for delivering the warmed or cooked ingredients to a plate or to a bowl or other container, and a cleaning orientation.

13 Claims, 9 Drawing Sheets

(51) Int. Cl.
*A47J 27/00* (2006.01)
*A47J 36/16* (2006.01)
*A47J 43/07* (2006.01)
*B25J 9/02* (2006.01)
*H05B 6/12* (2006.01)
*A47J 43/046* (2006.01)

(52) U.S. Cl.
CPC ............ *A47J 36/165* (2013.01); *A47J 36/34* (2013.01); *A47J 43/0727* (2013.01); *B25J 9/02* (2013.01); *H05B 6/12* (2013.01); *A47J 43/046* (2013.01)

(58) Field of Classification Search
USPC .......................... 99/348, 423, 424; 219/621
See application file for complete search history.

(56) References Cited

U.S. PATENT DOCUMENTS

| | | | |
|---|---|---|---|
| 4,136,804 A | 1/1979 | Kinzler et al. | |
| 4,173,925 A | 11/1979 | Leon | |
| 4,623,008 A | 11/1986 | Shibata et al. | |
| 4,919,950 A | 4/1990 | Mak | |
| 4,993,593 A | 2/1991 | Fabiano et al. | |
| 5,228,382 A | 7/1993 | Hayashi et al. | |
| 5,259,300 A * | 11/1993 | Yajima | A47J 37/047 366/225 |
| 5,386,102 A | 1/1995 | Takikawa | |
| 6,112,645 A | 9/2000 | Chang | |
| 6,843,166 B1 | 1/2005 | Li | |
| 7,001,626 B2 | 2/2006 | Sands et al. | |
| 7,174,830 B1 | 2/2007 | Dong | |
| 8,276,505 B2 | 10/2012 | Buehler | |
| 8,707,862 B1 | 4/2014 | Oliver et al. | |
| 8,820,219 B2 | 9/2014 | Buehler | |
| 9,131,807 B2 | 9/2015 | Roy et al. | |
| 10,154,762 B2 | 12/2018 | Farid et al. | |
| 10,638,876 B2 * | 5/2020 | Zhang | A47J 27/002 |
| 2002/0015355 A1 | 2/2002 | Sanpei et al. | |
| 2003/0159593 A1 | 8/2003 | Leutwyler | |
| 2004/0149776 A1 | 8/2004 | Fegin et al. | |
| 2004/0173103 A1 | 9/2004 | Won | |
| 2010/0064901 A1 | 3/2010 | Clothier et al. | |
| 2010/0303972 A1 | 12/2010 | Srivastava | |
| 2011/0308989 A1 * | 12/2011 | Berrux | A47J 36/02 206/524.3 |
| 2014/0230660 A1 | 8/2014 | He | |
| 2015/0019354 A1 | 1/2015 | Chan et al. | |
| 2015/0122133 A1 | 5/2015 | Zhang | |
| 2015/0245419 A1 * | 8/2015 | Millett | H05B 6/12 219/621 |
| 2015/0313404 A1 * | 11/2015 | Corrado | C22C 21/00 219/621 |
| 2016/0235239 A1 | 8/2016 | Patadia | |
| 2017/0142780 A1 | 5/2017 | Hoare et al. | |
| 2017/0354287 A1 | 12/2017 | Chang | |

FOREIGN PATENT DOCUMENTS

| | | |
|---|---|---|
| WO | 2013106954 A1 | 7/2013 |
| WO | 2017189147 | 11/2017 |
| WO | 2019212746 | 11/2019 |

OTHER PUBLICATIONS

PCT/US2019/027710; International Search Report and Written Opinion; dated Jun. 19, 2019; US.

* cited by examiner

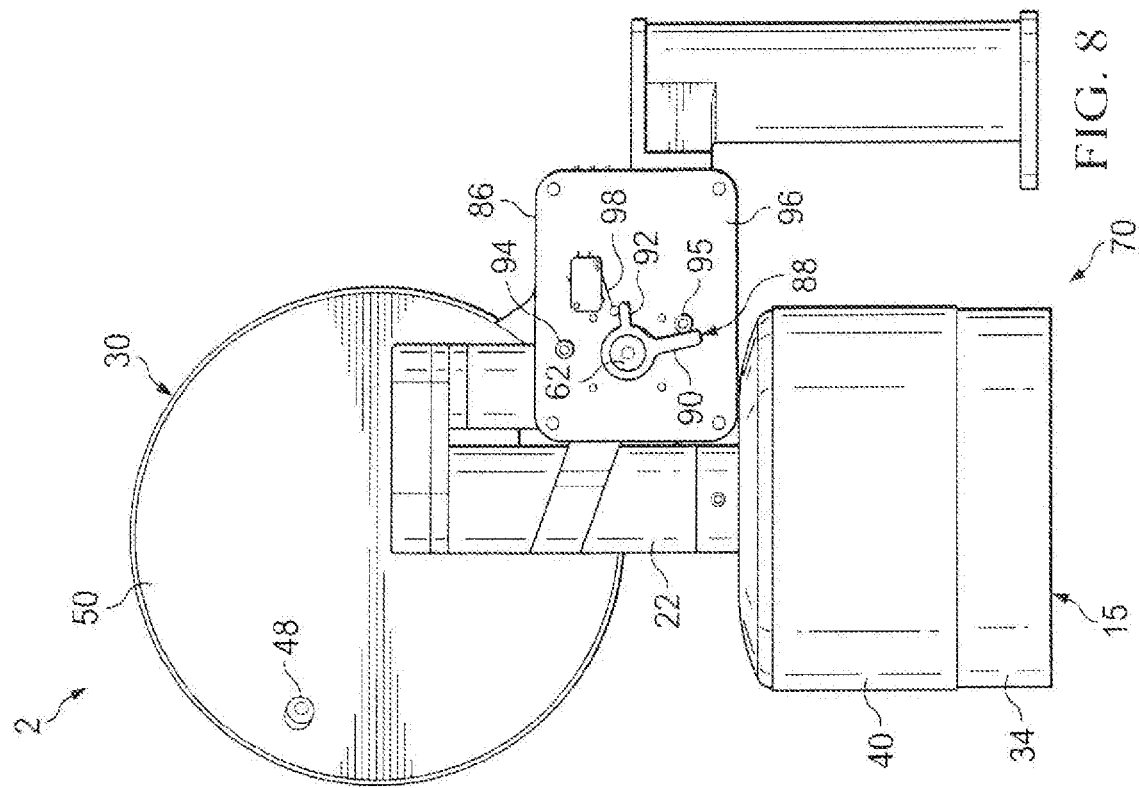

ROBOTIC HEATING APPARATUS AND METHOD

This application claims the benefit of U.S. Provisional Patent Application Ser. No. 62/664,568 filed on Apr. 30, 2018, and incorporates said provisional application by reference into this document as if fully set out at this point.

FIELD OF THE INVENTION

The present invention relates to automated warming and cooking apparatuses and methods for preparing meals and food entrées.

BACKGROUND OF THE INVENTION

On any given day, about one quarter of the US population eats some form of take out or fast food. While this may be a convenient and cost effective alternative to making home cooked meals, fast food and take-out meals are often unhealthy and consist of lower quality ingredients. Fast food restaurants spend significantly more on employee costs and rent than they do on food and beverage costs. These operating costs prevent restaurants from being able to sell high-quality meals at affordable prices.

Consequently, a need exists for automated apparatuses and methods which can be used in restaurants, food courts, kiosks, and elsewhere for preparing a variety of healthy, delicious meals and entrées, using high quality ingredients, which can be provided to customers at prices comparable to those charged by fast food establishments.

Many fast food and take out restaurants compromise on food quality in order to offer competitive prices. On average, low cost, limited service restaurants spend just 28% of total income on food and beverage costs, compared to 27% on labor and 10% on rent. At many fast food restaurants, the face value of most of the meals provided far exceeds the cost of the ingredients. In an industry that is so competitive on price, restaurants are forced to use cheaper processed ingredients and cannot dedicate resources toward food and meal development. Poor quality fast food has been shown to be a major contributor to obesity in the U.S.

Consequently, a need exists for an alternative to fast food restaurants which provides healthier meals at competitive prices.

SUMMARY OF THE INVENTION

The present invention provides a robotic heating apparatus and method which satisfy the needs and alleviate the problems discussed above. As used herein and in the claims, the terms "robotic heating apparatus" and "robotic heating and mixing apparatus" refer to an automated apparatus which will automatically perform various tasks involved in and/or related to warming and/or cooking processes. The inventive robotic heating apparatus can be used as a stand-alone unit, or can be incorporated and used in a fully automated food preparation system.

By way of example, in one type of fully automated food preparation system which utilizes the inventive robotic heating apparatus, a customer or operator is allowed to choose from a variety of menu items. The ingredients for the menu items are preferably be stored, under proper temperature conditions, in the fully automated system. When the menu item is selected, or at a later time as determined by the automated system or as instructed by the customer or operator, the ingredients rot the meal or entrée will preferably be automatically delivered to the inventive robotic heating apparatus which will cook or warm the meal or entrée in accordance with a programmed recipe and/or in accordance with any new, modified, or additional instructions entered by the user.

Also by way of example, but not by way of limitation, the inventive robotic heating apparatus and method are well suited for preparing stir fry, pasta dishes, rice dishes, and other dishes and entrées which comprise small-part ingredients that need to be simultaneously mixed and heated. In the fully automated system which utilizes the inventive robotic heating apparatus, the customer or operator will preferably have the option of customizing the selected meal or entrée by choosing from different available sauces or ingredients. In addition, the menu system will preferably allow the customer or operator to select proteins, vegetables and starches to create their own meals. The customer will also preferably have the option of using a mobile app, or a touchscreen or other user interface, to order and pay for the selected items using a credit card or debit card.

In one aspect, there is provided a robotic heating and mixing apparatus comprising a heating pot mounted for rotating the heating pot about a longitudinal rotational axis of the heating pot. The heating pot preferably has (i) a closed base end, (ii) an opening at an outer end of the heating pot through which food ingredients are received by and delivered from the heating pot, (iii) a side wall which extends longitudinally from the closed base end and surrounds the longitudinal rotational axis, (iv) a heating cavity within the cooking pot which is surrounded by the side wall, and (v) an interior surface of heating cavity. The heating pot is also mounted for pivoting the heating pot about a secondary axis between (i) a receiving orientation, (ii) a heating and mixing orientation, and (iii) a dispensing orientation. The robotic heating and mixing apparatus preferably also comprises (a) an induction heating element which is positioned adjacent to the side wall of the heating pot at least when the heating pot is in the heating and mixing orientation and (b) a band of ferromagnetic metal which is provided on and surrounds the side wall of the heating pot.

In another aspect, there is provided a robotic heating and mixing apparatus comprising a heating pot mounted for rotating the heating pot about a longitudinal rotational axis of the heating pot wherein: (a) the heating pot has (i) a closed base end, (ii) an opening at an outer end of the heating pot through which food ingredients are received by and delivered from the heating pot, (iii) a side wall which extends longitudinally from the closed base end and surrounds the longitudinal rotational axis, (iv) a heating cavity within the heating pot which is surrounded by the side wall, and (v) an interior surface of heating cavity; (b) the heating pot is also mounted for pivoting the heating pot about a secondary axis between (i) a receiving orientation, (ii) a heating and mixing orientation, and (iii) a dispensing orientation; and (c) the robotic heating and mixing apparatus further comprises a non-contact temperature sensor positioned to have a line-of-sight view of the interior surface of the heating cavity of the hearing pot, at least when the heating pot is in the heating and mixing orientation, for reading a temperature of the interior surface of the heating cavity.

In another aspect, there is provided a robotic heating and mixing apparatus comprising a heating pot mounted for rotating the heating pot about a longitudinal rotational axis of the heating pot wherein: (a) the heating pot has (i) a closed base end, (ii) an opening at an outer end of the heating pot through which food ingredients are received by and delivered from the heating pot, (iii) a side wall which extends longitudinally from the closed base end and surrounds the longitudinal rotational axis, (iv) a heating cavity within the heating pot which is surrounded by the side wall, and (v) an interior surface of heating cavity; (b) the heating pot is also mounted for pivoting the heating pot about a secondary axis between (i) a receiving orientation, (ii) a heating and mixing orientation, and (iii) a dispensing orientation; (c) the robotic heating and mixing apparatus further comprises a spray element positioned to spray water and/or a cleaning agent into the heating cavity of the heating pot when the heating pot is in a downwardly facing position; (d) the robotic heating and mixing apparatus also comprises a spray activation arm which pivots with the heating pot about the secondary axis; (e) the robotic heating and mixing apparatus additionally comprises an activation switch which is contacted by the spray activation arm, when the heating rot pivots to a downwardly facing position, to activate the spray element to spray the water and/or the cleaning agent into the cavity of the heating pot when the heating pot is in the downwardly lacing position; and (f) the activation switch is mounted in a stationary position so that the activation switch does not rotate with the heating pot about the longitudinal rotational axis of the heating pot and does not pivot with the heating pot about the secondary axis.

Further aspects, features, and advantages of the present invention will be apparent to those in the art upon examining the accompanying drawings and upon reading the following detailed description of the preferred embodiments.

BRIEF DESCRIPTION OF THE DRAWINGS

FIG. 8 is another elevational side view of the inventive robotic heating and mixing apparatus 2 in the cleaning orientation 70.

DETAILED DESCRIPTION OF THE PREFERRED EMBODIMENTS

Figure 1:
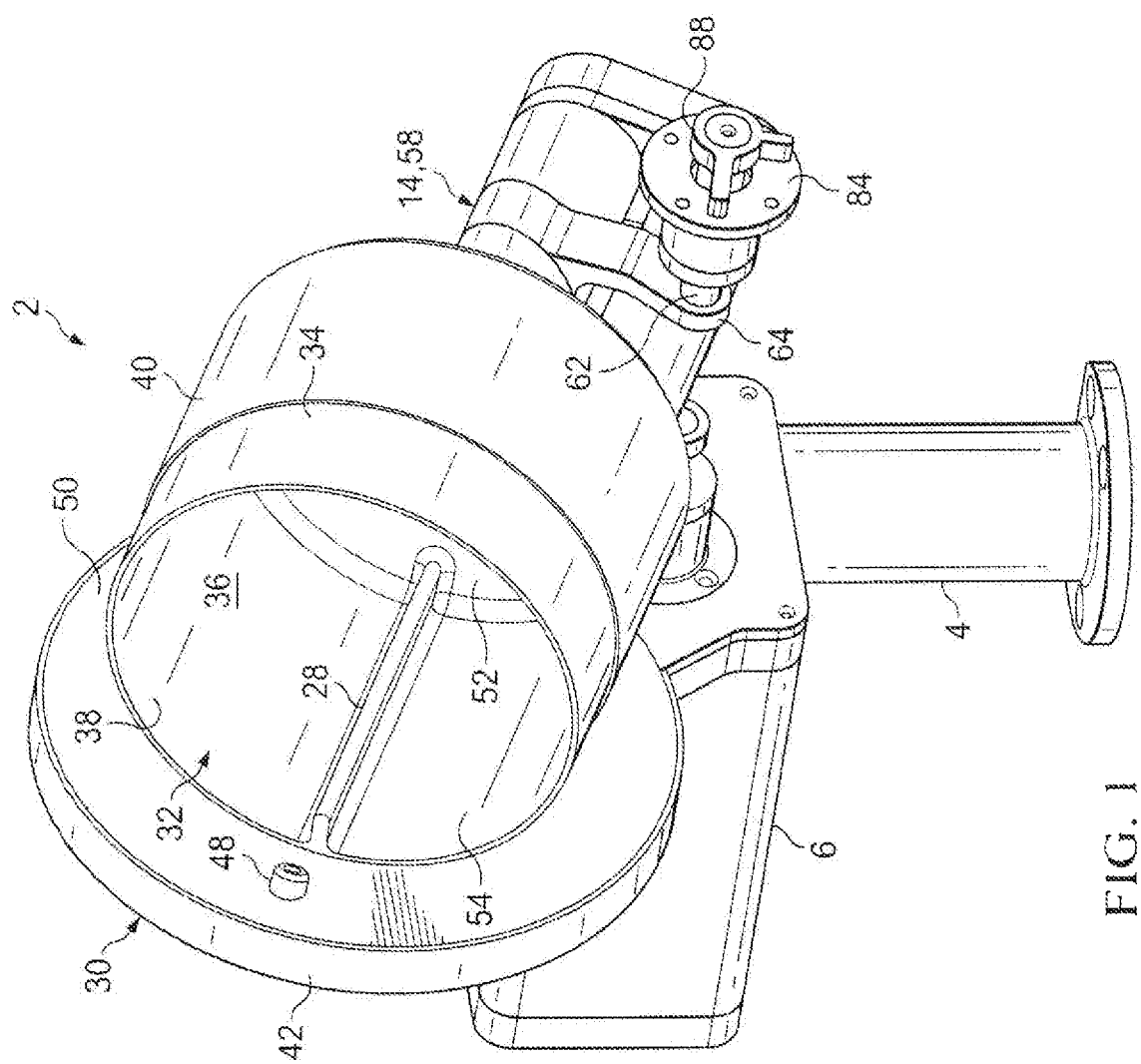
FIG. 1 is a front perspective view of an embodiment 2 of the robotic heating and mixing apparatus provided by the present invention.

An embodiment 2 of the inventive robotic heating and mixing apparatus is illustrated in FIGS. 1-10. The inventive apparatus comprises: a support post or other mounting structure 4 of any type suitable for mounting the inventive robotic apparatus 2 on any desired horizontal, vertical, or angled surface or structure; a gimbal motor housing 6 which is mounted on and supported by the mounting structure 4; a gimbal motor 8 which is contained within the housing 6; a drive shaft 10 of the gimbal motor 8 which projects from an end 12 of the gimbal motor housing 6; a gimbal mounting structure or assembly 14 secured on the projecting drive shall 10 of the gimbal motor 8; a heating pot 15 having a rotational shaft 16 (FIG. 9) which extends from the closed base end 18 of the heating pot 15 for rotating/spinning the heating pot 15 about the longitudinal rotational axis 20 of the pot 15; a cylindrical housing 22, through which the rotational shaft 16 of the heating pot 15 extends, which is held by the gimbal mounting structure or assembly 14 for pivoting the heating pot 15 about the gimbal axis 24; a drive motor 26 which drives the rotational shaft 16 of the heating pot 15 to rotate the heating pot 15 about the longitudinal rotational axis 20; a mixing structure 28 within the heating pot 15; and at least one heating element 30 for heating the heating pot 15 during cooking or warming.

The heating pot 15 preferably comprises: (i) an opening 32 at the outer end of the heating pot 15 for receiving the ingredients for the selected menu item and discharging the dish or entrée from the pot 15 after cooking or warming; (ii) a side wall 34 which extends longitudinally from the closed base end 18 and surrounds the longitudinal rotational axis 20; (iii) a heating cavity 36 within the heating pot 15 which is surrounded by the side wall 34; and (iv) an interior surface 38 of the heating cavity 36.

Examples of heating elements 30 suitable for use in the inventive robotic heating apparatus 2 include, but are not limited to, induction heating elements, gas burners, electrical heating elements, heat guns, etc. The heating element 30 will preferably be an induction heating element. In conjunction with the induction heating element 30, the heating pot 15 will preferably either (a) be formed of a ferromagnetic metal (e.g., stainless steel) or (b) be surrounded by an exterior band 40 of ferromagnetic metal so that the rapidly changing field produced by the induction heating element 30 will produce eddy currents in the ferromagnetic met at which will cause the heating pot 15 to heat up rapidly to the desired cooking or warming temperature. The heating pot 15 will most preferably be formed of aluminum or other material having high heat conducting and heat distribution properties and will preferably comprise an exterior band 40 of stainless steel or other ferromagnetic metal which is secured on and surrounds the side wall 34 of the heating pot 15. In addition, the interior surface 38 of the heating cavity 36 will preferably be coated with Teflon or other non-stick material.

Figure 5:
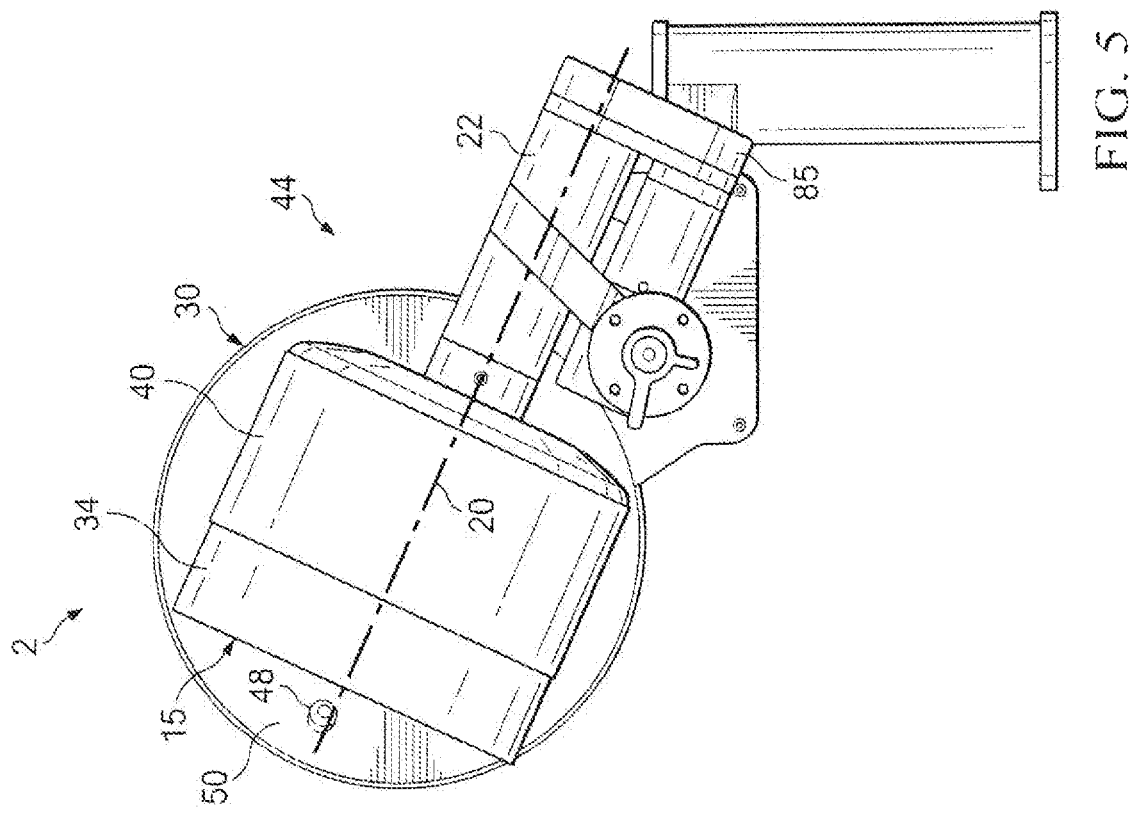
FIG. 5 is an elevational side view of the inventive robotic heating and mixing apparatus 2 positioned in a heating and mixing orientation 44.

In the embodiment 2 of the inventive robotic heating and mixing apparatus illustrated in FIGS. 1-10, the induction heating element 30 is contained within an induction element housing 42 which is preferably secured on the gimbal motor housing 6 in a fixed position and is preferably oriented such that the housing 42 and the induction element 30 contained therein (a) will be positioned adjacent, and in close proximity, to the side wall 34 of the heating pot 15 when the heating pot 15 is pivoted about the gimbal axis 24 to place the pot 15 in a heating and mixing orientation 44 as illustrated in FIG. 5 and (b) will not rotate with the heating pot 15 about the longitudinal rotational axis 20 or pivot with the heating pot 15 about the secondary axis (i.e., the gimbal axis) 24. The housing 42 for the induction heating element 30 preferably also includes an air circulation fan 46 for cooling the induction element 30.

The inventive robotic heating and nixing apparatus 2 preferably also includes an infrared or other type of non-contact temperature sensor 48 for determining the temperature of the interior surface 38 of the heating cavity 36 of the pot 15 at least during the heating and mixing operation. The non-contact temperature sensor 48 will preferably have a direct line-of-sight view of the interior surface 38 of the heating cavity 36 when the heating pot 15 is in the heating and mixing orientation 44 illustrated in FIG. 5. Most preferably, the non-contact temperature sensor 48 will be mounted at a location on a surface 50 of the induction element housing 42 which faces the heating pot 15 such that the non-contact temperature sensor 48 will have a direct line-of-sight view of the interior surface 38 of the heating cavity 36 when the heating pot 15 is in the heating and mixing orientation 44.

In addition, the weight of the ingredients in the heating pot will also preferably be known based, e.g., upon (a) measurements or otter readings or information supplied by the other subsystems of a fully automated food preparation system which includes and utilizes the inventive robotic heating apparatus 2 or (b) a load sell or other weight sensor provided in or associated with the gimbal mounting structure or assembly 14 or located elsewhere in the inventive robotic heating and mixing apparatus 2. By monitoring the temperature of the heating pot 15 and the weight of the ingredients in the pot 15, the optimal cook lime can be calculated and calibrated for different ingredients by the control program for the robotic heating and mixing apparatus 2 and/or by the control program of a fully automated food preparation system which includes and utilizes the inventive robotic heating apparatus 2. This ensures that the meal or entrée selected will be cooked thoroughly but net overcooked.

The internal mixing structure 28 within the heating pot 15 contacts, disrupts, agitates and mixes the ingredients of the selected menu item as the ingredients are tumbled in the heating cavity 36. The internal mixing structure 28 within the heating pot 15 is preferably formed on or attached to the interior surface 38 of the heating cavity 36 such that the internal mixing structure 28 projects from the interior surface 38 into the heating cavity 36 and is thus carried by the heating poi 15 in rotation with the heating pot 15 about the longitudinal rotational axis 20 of the pot 15.

Figure 2:
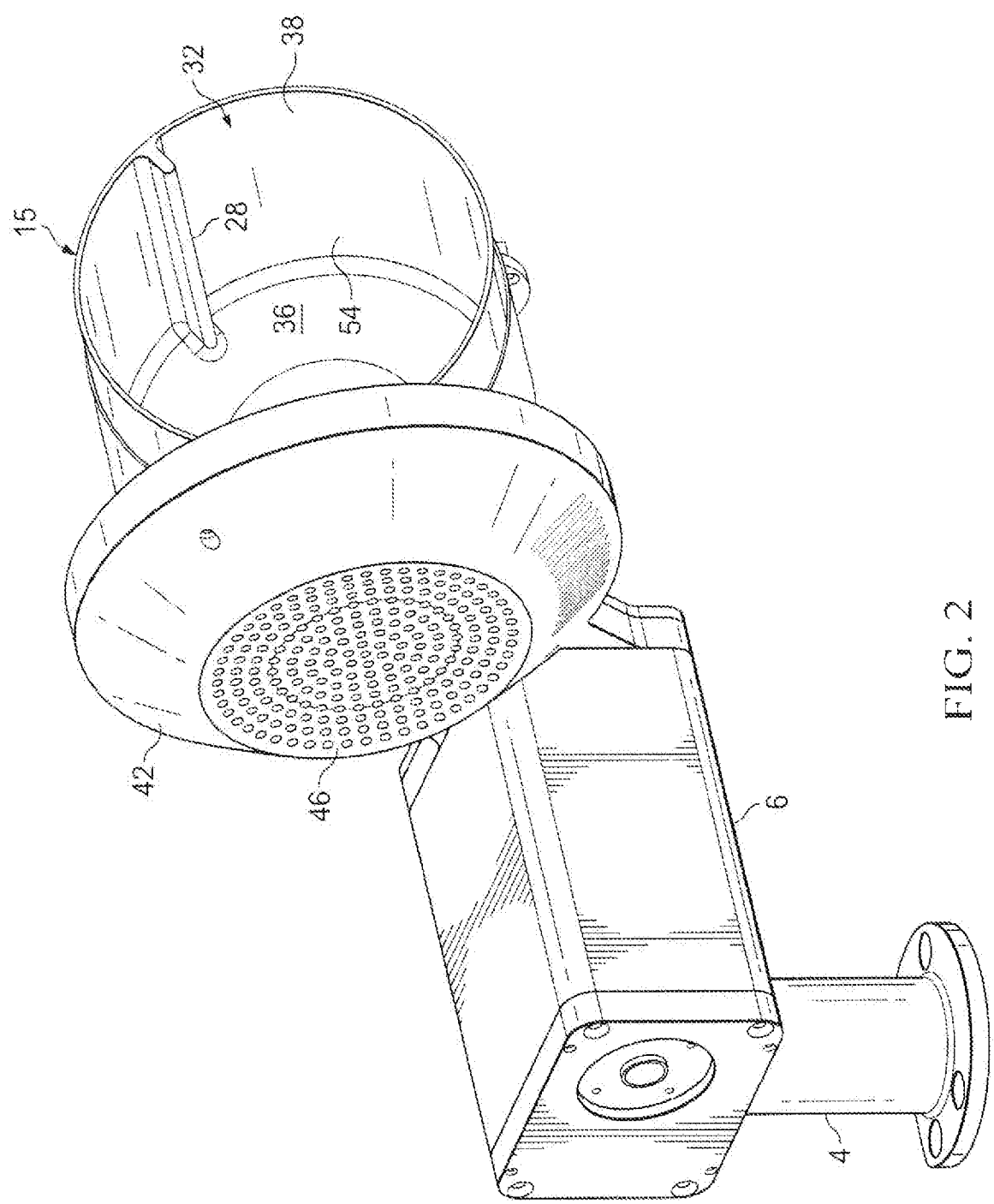
FIG. 2 is a rear perspective view of the inventive robotic heating and mixing apparatus 2.
Figure 3:
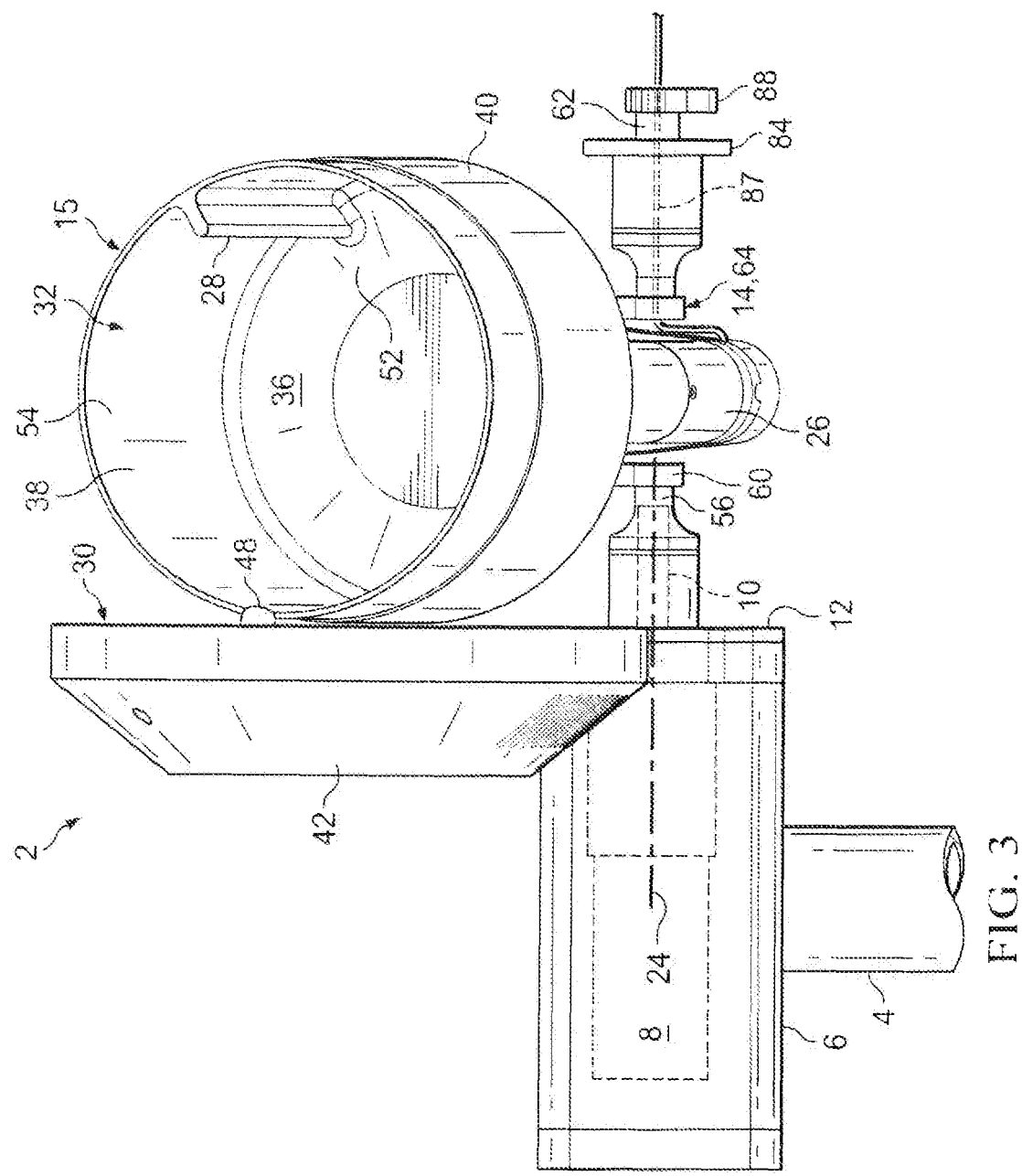
FIG. 3 is an elevational front view of the inventive robotic heating and mixing apparatus 2.

The mixing structure 28 is preferably an elongate bar or fin-type element as illustrated in FIGS. 1, 2, and 5 which extends longitudinally from the interior surface 52 of the closed base end 18 of the heating pot 15 along the interior surface 54 of the longitudinally extending side wall 34 of the pot 15. The width of the mixing structure 28 is preferably such that the mixing structure 28 extends from about 1 cm to about 6 cm into the heating cavity 36 from the interior surface 54 of the side wall 34. Although the mixing structure 28 can alternatively have any desired angled orientation and/or curved shape, the mixing structure 28 will preferably by a non-curved, non-angled bar or fin-type element which projects from die interior surface 54 of the side wall 34 directly toward or substantially toward the longitudinal rotational axis 20 of the heating pot 15.

The gimbal mounting structure or assembly 14 for the heating pot 15 preferably comprises: an initial axial segment 56 which extends from, is in alignment with, and is coaxial with the drive shaft 10 of the gimbal motor 8; an inverted U-shaped segment 58 having an inner leg 60, the lower end portion of which is connected to the distal end of the initial axial segment 56; and an outer axial segment 62 which is connected to the lower end portion of the outer leg 64 of the inverted U-shaped segment 58. The outer axial segment 62 is also in alignment and coaxial with the drive shaft 10 of the gimbal motor 8 and with the initial axial segment 56 of the gimbal mounting structure 14. The cylindrical housing 22 of the rotational shaft 16 of the heating pot 15 is received and connected within the inverted U-shaped segment 58 of the gimbal mounting structure or assembly 14.

Consequently, as the initial axial segment 56 and the outer axial segment 62 of the gimbal mounting structure or assembly 14 are caused by the gimbal motor 8 to rotate about the gimbal axis 24, the inverted U-shaped central portion 58 of the gimbal mounting structure or assembly 14 carries the heating pot 15, the rotational shall 16 of the pot 15, and the cylindrical housing 22 of the pot rotational shaft 16 in a corresponding pooling movement about the gimbal axis 24. The gimbal motor 8 is preferably a stepper motor or similar device which will pivot the heating pot 15 about the gimbal axis 24 between a desired set of orientations for robotically performing required tasks.

Figure 4:
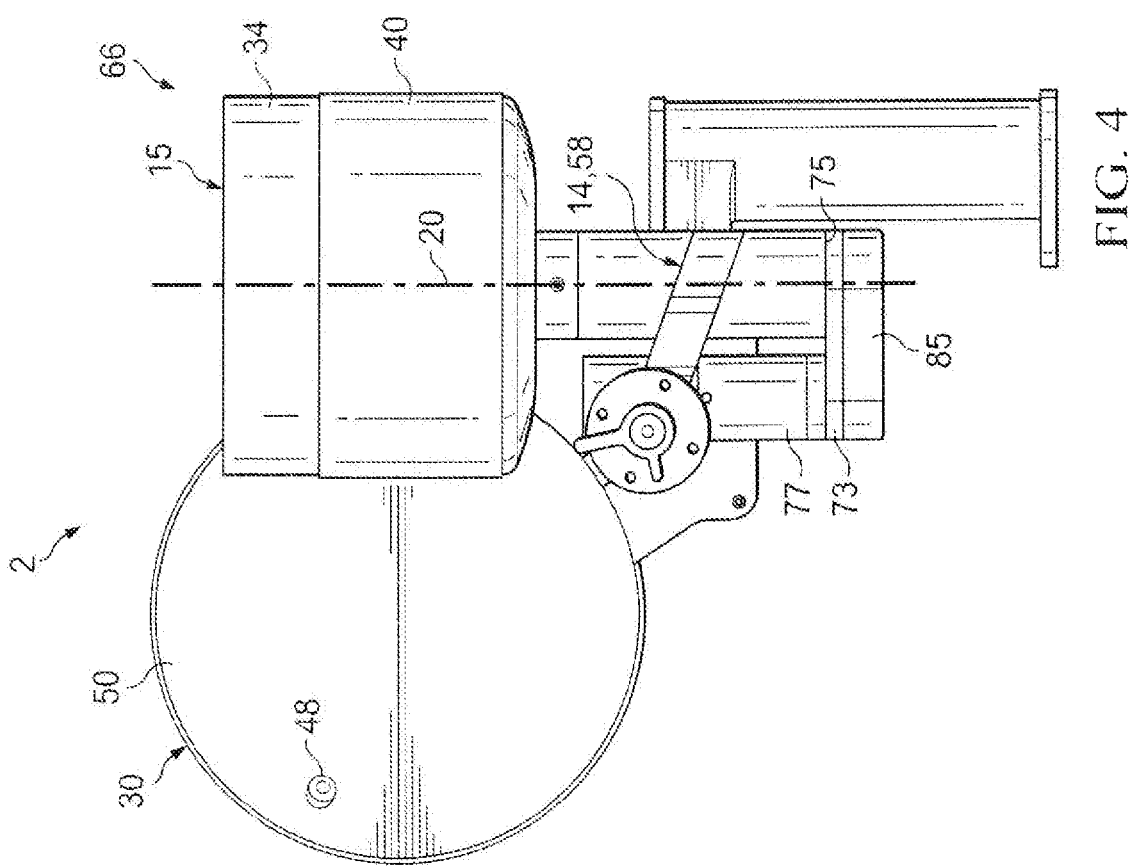
FIG. 4 is an elevational side view of the inventive robotic heating and mixing apparatus 2 positioned in a loading orientation 66.
Figure 7:
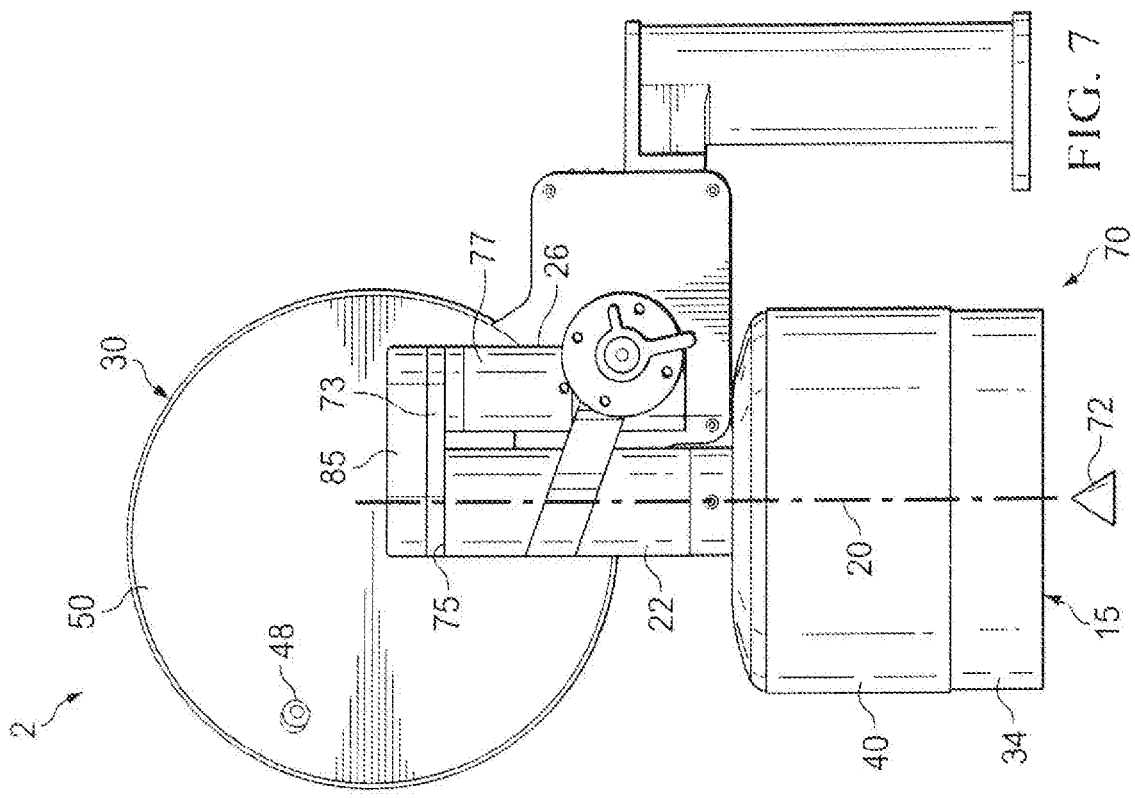
FIG. 7 is an elevational side view of the inventive robotic heating and mixing apparatus 2 positional in a cleaning orientation 70.
Figure 6:
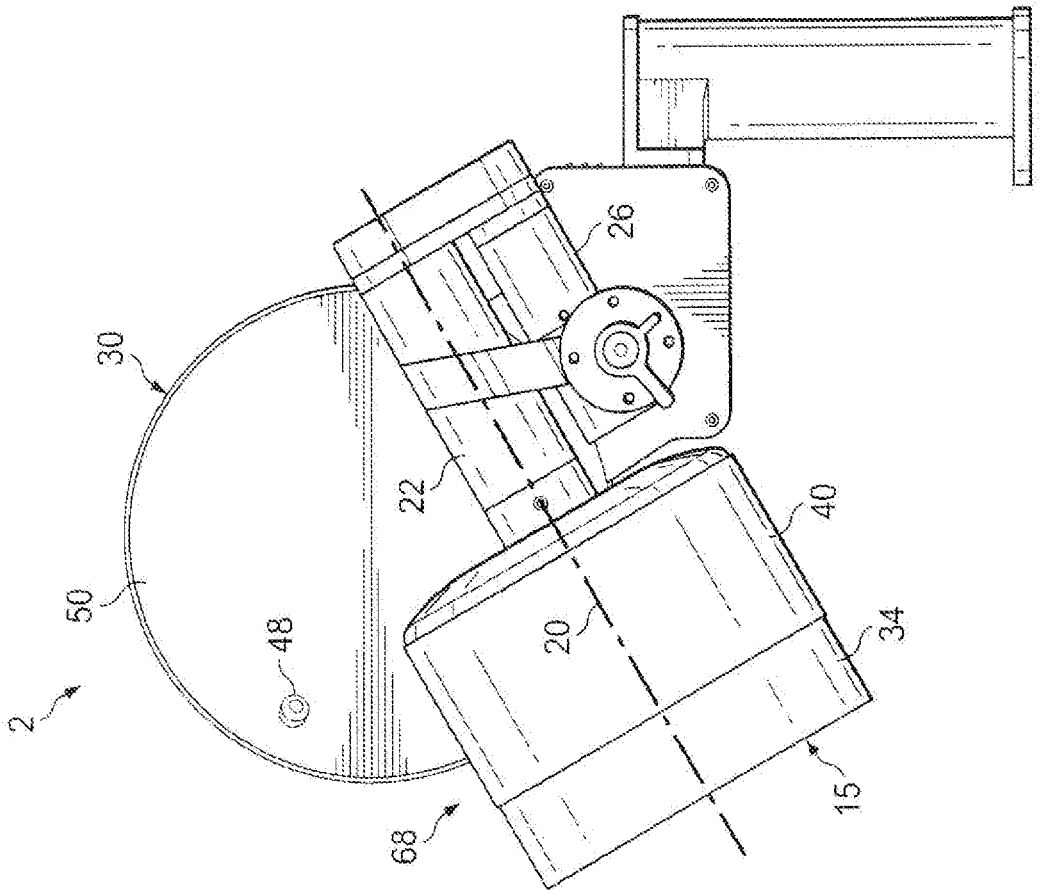
FIG. 6 is an elevational side view of the inventive robotic heating and mixing apparatus 2 positioned in a serving orientation 68.
Figure 9:
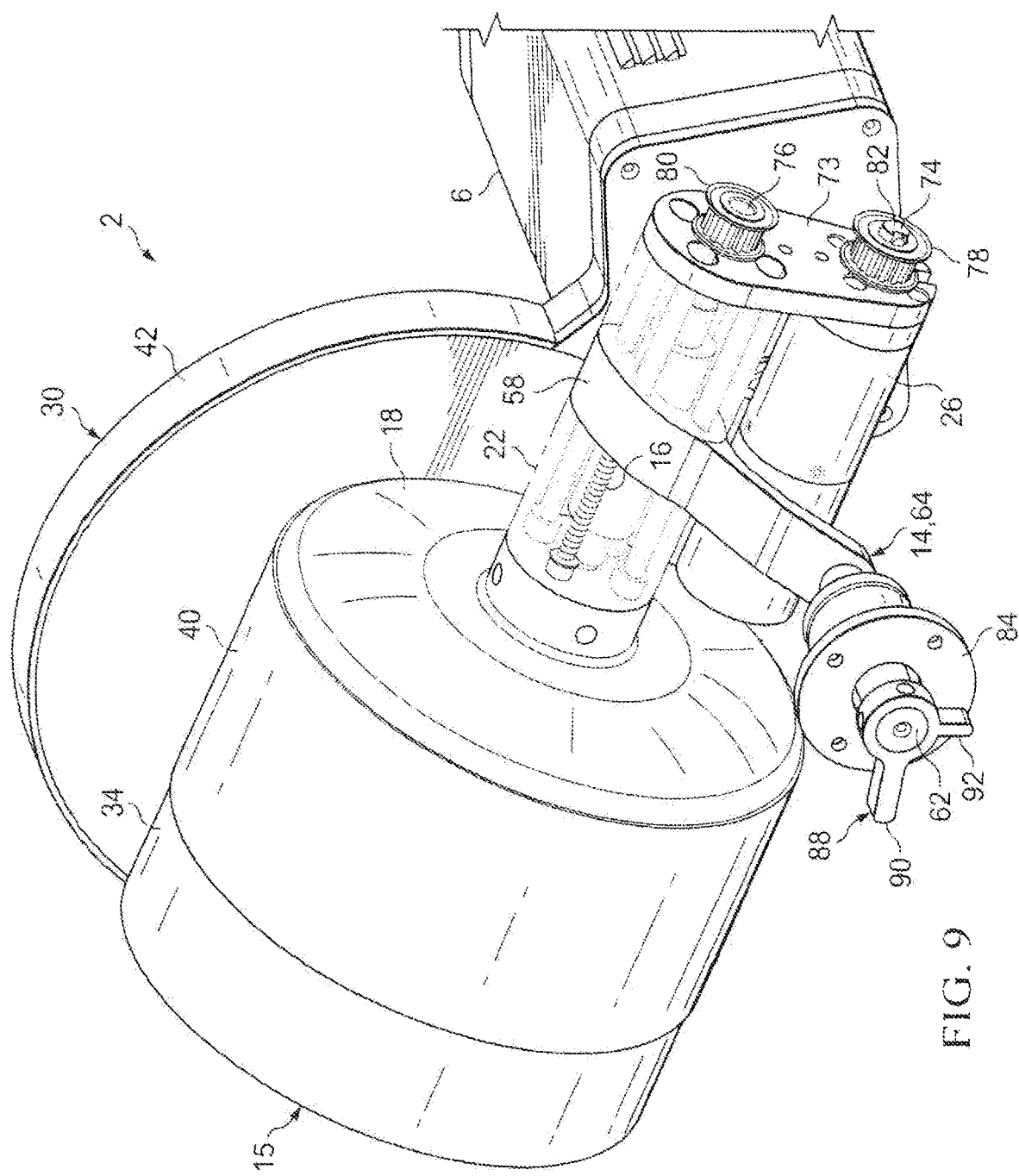
FIG. 9 is a partially cutaway rear perspective view of the inventive robotic heating and mixing apparatus 2.

A set of tour preferred gimbal orientations for the heating pot 15 are illustrated in FIGS. 4-7. One of these orientations is the heating and mixing orientation 44 shown in FIG. 5. The other preferred orientations are: a loading orientation 66 as shown in FIG. 4; a serving orientation 68 as shown in FIG. 6; and a cleaning orientation 70 as shown in FIG. 7.

In the loading orientation 66, the longitudinal rotational primary axis 20 of the heating pot 15 is preferably pointing vertically upward, or can be at any other desired loading orientation, so that the ingredients for the selected item can be dropped into or otherwise placed in the heating cavity 36 of the pot 15. After the pot 15 has been loaded with the ingredients needed for the selected item, the heating pot 15 gimbals to the heating and mixing orientation 44, which is preferably in a range of from about 60° to 90° from vertical. When the heating pot 15 is moved to the heating and mixing orientation 44, the heating pot 15 is preferably caused by the drive motor 26 spin to late about the longitudinal rotational axis 20 of the pot 15 during the cooking or warming operation. Also, the heating element 30 is automatically activated to heat the heating pot 15 for the cooking or warming operation and to maintain the desired cooking or warming temperature for the menu item selected.

When the heating and mixing operation is complete, the heating pot 15 gimbals to the serving orientation 68 which is preferably from about 120° to about 180°, more preferably about 160°, from vertical so that the food will fall onto a plate or into a bowl, carton or other receptacle for eating or serving. At this point, if it is necessary to mix or both heat and mix more ingredients to complete the meal or entrée, the heating pot 15 can be returned to the loading orientation 68 and the loading, heating, and serving steps can be repeated. On the other hand, if the preparation of the meal or entrée has beer completed, the pot 15 gimbals to the cleaning orientation 70 in which the longitudinal rotational axis 20 of the cooking pot 15 is preferably pointing vertically downward, or can be at any ether desired cleaning orientation.

A spray nozzle or other spraying element 72 is positioned beneath the cooking pot 15 for automatically spraying water, an aqueous cleaning solution, and/or other cleaning solution into the heating pot 15 when the heating pot 15 is pivoted to the cleaning orientation 70. Also, if desired, the drive motor 26 for rotating the heating pot 15 can be automatically activated when the heating pot 15 is in the cleaning orientation 70, or in any other orientation, to cause the heating pot 15 to rotate about the longitudinal rotational axis 20 of the pot 15.

The drive motor 26 used for rotating the heating pot 15 about its longitudinal rotational axis 20 is mounted adjacent to the cylindrical housing 22 of the rotational shaft 16 of the heating pot 15 so that the drive motor 26 will pivot in conjunction with rotational shall 16 of the heating pot 15 about the gimbal axis 24. The drive motor 26 is preferably mounted adjacent to the shaft housing 22 using a mounting plate or similar structure 73 which is secured to both the rearward end 75 of the shaft housing 22 and to the rearward end of the housing 77 of the drive motor 26, and through which the drive shaft 74 of the drive motor 26 and the distal end portion 76 of the rotational shaft 16 of the heating pot 15 each rotatably extend. Although other types of driving linkages can also alternatively be used, timing pulleys 78 and 80 are preferably provided, respectively, on the distal end portion 82 of the motor drive shaft 74 and the distal end portion 76 of the rotational shaft 16 of the pot 15 for driving the rotation of the heating pot 15 using a timing belt which extends around the liming pulleys 78 and 80.

A cover 85 is preferably attachable to the mounting plate 72 for covering the timing belt and liming pulleys 78 and 80. A power cable 87 for the drive motor 26 preferably extends through the outer axial segment 62 of the gimbal mounting assembly 14.

The gimbal mounting assembly 14 of the inventive robotic heating and mixing apparatus preferably also comprises: an outer flange structure 84 through which the outer axial segment 62 of the gimbal mounting assembly 14 rotatably extends; a base plate or other base structure 86 (FIG. 8) which is mounted on the outer flange structure 84 such that the outer axial segment 62 of the gimbal mounting assembly 14 also rotatably extends through the base structure 86; and a limit arm piece 88 which is attached on the distal end of the outer axial segment 62 of the gimbal mounting assembly 14 such that the limit arm piece 88 rotates about the gimbal axis 24 along with the outer axial segment 62. The limit arm piece 88 includes a long contact arm 90 and a short contact arm 92 which each extend radially outward from the limit arm piece 88.

When the inventive robotic heating and mixing apparatus 2 is installed, the outer flange structure 84 of the gimbal mounting assembly 14 and the base structure 86 mounted on the flange structure 84 are preferably retained in fixed position such that the outer flange structure 84 and the base structure 86 do not rotate about the gimbal axis 24 with the outer axial segment 62 of the gimbal mounting assembly 14.

As the heating pot 15 is pivoted about the gimbal axis 24 to the upwardly facing loading orientation 66, the long contact arm 92 of the limit arm piece 88 contacts a post or other stop structure 94 provided on the outer face 96 of the stationary base structure 86 which prevents the heating pot 15 from pivoting past the upwardly facing loading orientation 66. Similarly, as the heating pot 15 is pivoted about the gimbal axis 24 to the downwardly facing cleaning orientation 70, the long contact arm 92 of the limit arm piece 88 contacts a second post or other stop structure 95 provided on the outer face 96 of the base structure 86 which prevents the cooking pot 15 from pivoting past the downwardly facing cleaning orientation 70.

In addition, when the cooking pot 15 reaches the downwardly facing cleaning orientation 70, the short contact arm 94 of the limit arm piece 88 contacts a limit switch or other activation switch 98 provided on the outer face 96 of the base structure 86 which activates an electric pump or other delivery system for spraying a cleaning solution and/or rinse water from the spraying element 72 into the cooking pot 15.

Figure 10:
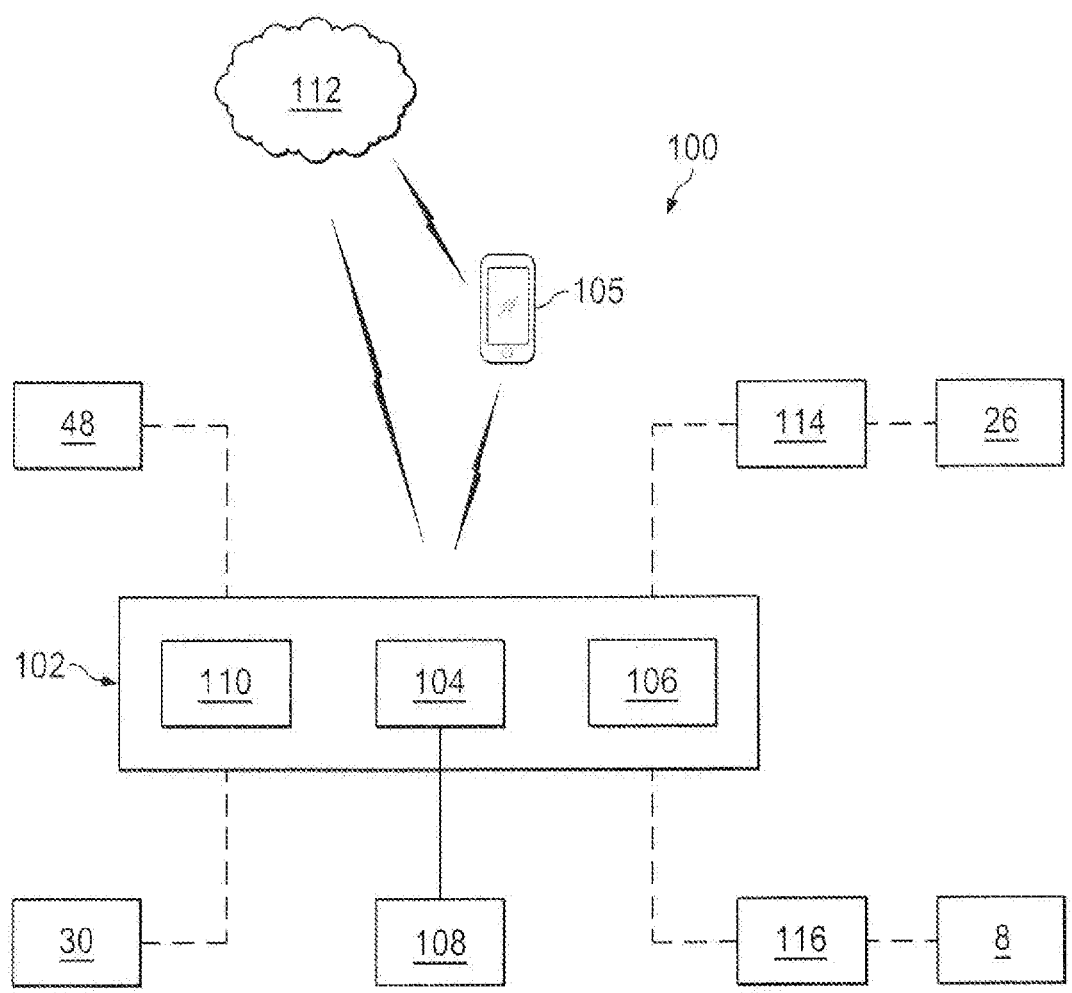
FIG. 10 schematically illustrates a robotic control system 100 of the inventive robotic heating and mixing apparatus 2.

A robotic control system 100 for the inventive robotic heating and mixing apparatus 2 is illustrated in FIG. 10. The robotic control system 100 comprises a control unit 102 which is preferably housed in the inventive heating and mixing apparatus 2. However, some of the components, data, operating instructions, etc. of the control system can alternatively be located elsewhere such as, e.g., in (a) a larger automated food preparation system which includes and utilizes the inventive robotic apparatus 2, (b) in a remote server or other cloud system, and/or (c) an app which is downloaded to a smart phone or other wireless device.

The control unit 102 comprises a microprocessor or other computer processing unit 104 and a computer readable medium, device, or other fixed or removable storage component 106 which is readable by the processing unit 104.

The control logic and other programmed instructions for the control unit 102 are preferably embodied (i.e., stored) on or in the computer readable storage component 106 in the form of program code which is readable by the processing unit 104 to cause the control unit 102 to automatically perform, activate and or control the operation of the inventive robotic heating and mixing apparatus 2.

A touch pad, key board, lap top, or other user interlace device 108 can be provided for direct wired communication with the processing unit 104. Alternatively, or in addition, the control unit 102 can include a Wi-Fi, Bluetooth, radio frequency, infrared, or other wireless communication unit 110 for wirelessly receiving and/or sending communication signals to a smart phone, tablet, remote control, or other wireless device 105 either (a) directly and/or (b) indirectly via a remote server or other cloud based system 112.

Menu items for user selection, recipes, cooking instructions, sauce and ingredient options for user selection, default instructions, and any other operating instructions and operating parameters for executing the automatic robot it operation of the inventive robotic heating and mixing apparatus 2 can be included entirely, or in part, in the program code which is stored on the computer readable storage component 106 and/or can be stored in the cloud 112, in the memory of a control system for a larger automated food preparation system which includes and utilizes the inventive robotic apparatus 2, or elsewhere.

In the robotic control system 100 for the inventive heating and mixing apparatus 2, the control unit 102 is electronically linked (e.g., through either wired or wireless communication) to the non-contact temperature sensor 48 for monitoring the temperature of the interior surface 38 of the heating cavity 36 of the heating pot 15. The control unit 102 is also electronically linked at least to (a) the heating element 30, (b) an actuator 114 for the drive motor 26 which rotates the heating pot 15 about its longitudinal rotational axis 20, and (c) an actuator 116 for the gimbal motor 8. Consequently, the control unit 102 will operate to (1) activate and Control the heating element 30, (2) gimbal the heating pot 15 between its loading, heating and mixing, serving, and cleaning orientations 66, 44, 68, and 70, and (3) rotate the heating pot 15 about its longitudinal rotational axis 20 during at least the heating and mixing operation. Rotating the pot 15 during the heating and mixing operation not only helps to mix the ingredients in the pot 15, but ensures that the pot 15 is evenly heated by the heating element 30.

The computer processing unit 104 of the control unit 102 will preferably be a PSoC 5LP microcontroller, manufactured by Cypress Semiconductor. The main advantage of this microprocessor is that it has programmable digital logic, which allows for rapid electronics prototyping. It also includes hardware which is capable of controlling several actuators and reading process sensors al a fast rate.

Figure 11:
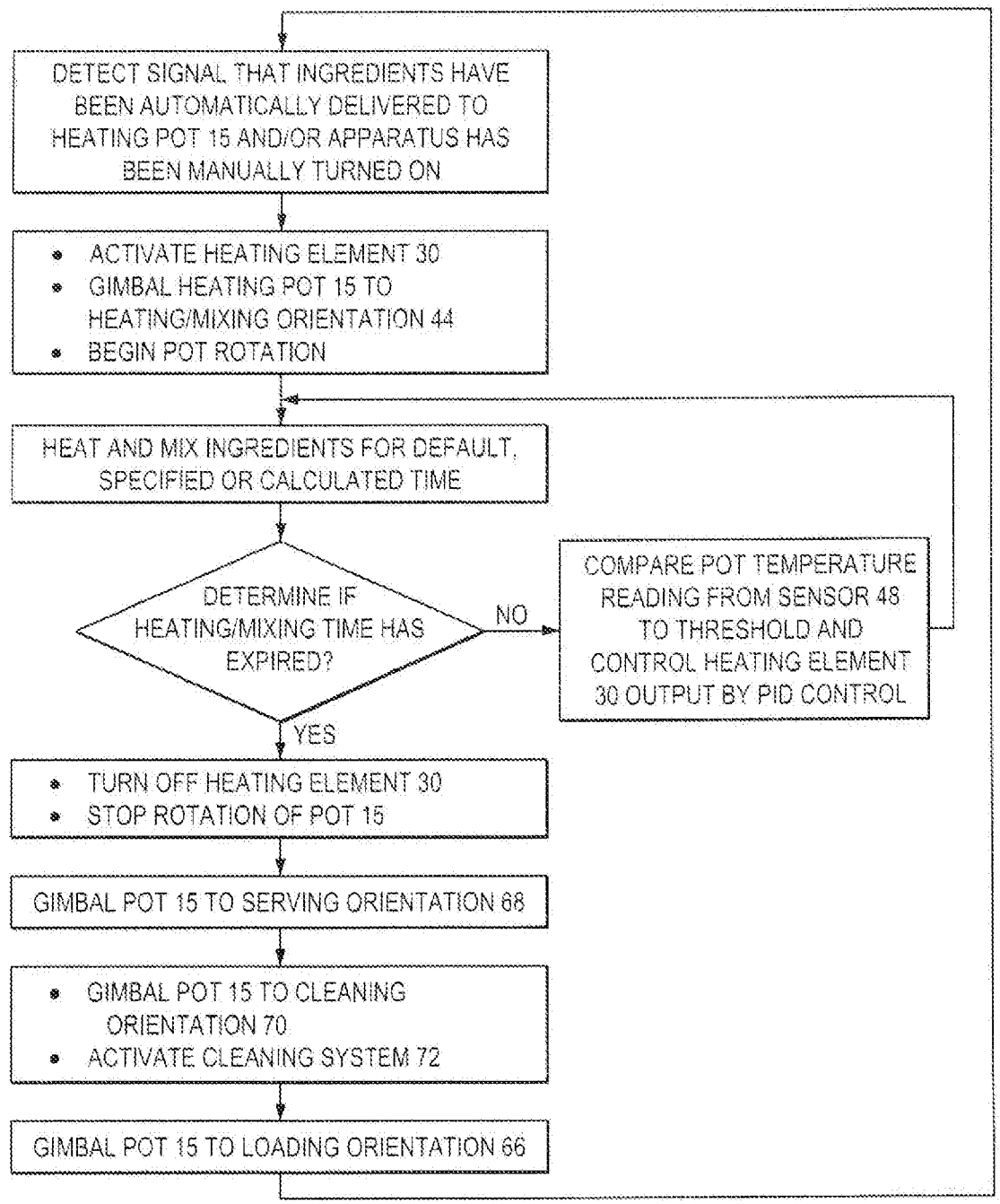
FIG. 11 is a flow chart of a program code embodied on or in a computer readable storage component 106 included in a control unit 102 of the robotic control system 100.

By way of example, but not by way of limitation, and as also illustrated in FIG. 11, the steps of the inventive method which are included in the program code stored in the computer readable storage component 106 of the computer processing unit 104 for robotically controlling the inventive heating and mixing apparatus 2 to prepare a selected or default meal or entrée preferably include: (a) detecting a signal that the apparatus 2 has been turned on or that the ingredients for the item have been automatically delivered into the heating pot 15; (b) activating the heating element 30 to begin the heating and mixing operation; (c) activating the actuator 116 for the gimbal motor 8 to gimbal the heating pot 15 from the loading orientation 66 to the heating and mixing orientation 44; (d) activating the actuator 114 for the drive motor 26 to rotate the heating pot 15 about us longitudinal rotational axis 20; (e) during the heating and mixing operation, monitoring the temperature of the interior surface 38 of the heating cavity 36 and comparing the monitored temperature to a threshold set point to control the temperature of the interior surface 38 of the heating cavity 36 in accordance with the threshold, preferably using PID control; (f) during step (e) lowering or increasing the heat output of the heating element 30 as determined by the PID control logic if the measured temperature is above or below the set threshold; (g) determining if a default heating time or a calculated or user specified heating time for the meal or entrée has expired; (h) if so, turning the heating element 30 and the drive motor 26 oil to discontinue the heating and rotation of the heating pot 15; (i) activating the actuator 116 for the gimbal motor 8 to gimbal the heating pot 15 from the heating and mixing orientation 44 to the serving orientation 68 so that the warmed or cooked meal or entrée is delivered onto a plate or into a container for eating, storing or serving; (j) activating the actuator 116 for the gimbal motor 8 to gimbal the heating pot 15 from the serving orientation 68 to the cleaning orientation 70; (k) activating the cleaning system 72 to clean and rinse the heating pot 15; and then (l) activating the actuator 116 for the gimbal motor 8 to gimbal the heating pot 15 from the cleaning orientation 70 to the loading orientation 44.

Thus, the present invention is well adapted to carry out the objects and attain the ends and advantages mentioned above as well as those inherent therein. While presently preferred embodiments have been described for purposes of this disclosure, numerous changes and modifications will be apparent to those in the art. Such changes and modifications are encompassed within this invention as defined by the claims.

What is claimed is:

1. A robotic heating and mixing apparatus for preparing a meal or entrée comprising:
   a heating pot mounted for rotating the heating pot about a longitudinal rotational axis of the heating pot;
   the heating pot having (i) a closed base end, (ii) an opening at an outer end of the heating pot through which food ingredients are received by, and delivered from, the heating pot, (iii) a side wall which extends longitudinally from the closed base end and surrounds the longitudinal rotational axis, (iv) a heating cavity within the heating pot which is surrounded by the side wall, and (v) an interior surface of the heating cavity;
   the heating pot also being mounted for pivoting the heating pot about a secondary axis between (i) a receiving orientation, (ii) a heating and mixing orientation, and (iii) a dispensing orientation;
   an induction heating element which is positioned adjacent to the side wall of the heating pot at least when the heating pot is in the heating and mixing orientation;
   a band of ferromagnetic metal which is provided on and surrounds the side wall of the heating pot; and
   a non-contact temperature sensor positioned to have a line of sight view of the interior surface of the heating cavity of the heating pot, at least when the heating pot is in the heating and mixing; orientation, for reading a temperature of the interior surface of the heating cavity.

2. The robotic heating and mixing apparatus of claim 1 wherein the side wall of the heating pot is formed of aluminum.

3. The robotic heating and mixing apparatus of claim 2 wherein the interior surface of the heating cavity of the heating pot is a Teflon-coated surface.

4. The robotic heating and mixing apparatus of claim 2 wherein the ferromagnetic metal is stainless steel.

5. The robotic heating and mixing apparatus of claim 1 further comprising a housing for the induction heating element, the induction heating element being located in the housing and the housing being mounted in a stationary position so that the housing and the induction heating element do not rotate with the heating pot about the longitudinal rotational axis of the heating pot and do not pivot with the heating pot about the secondary axis.

6. The robotic heating and mixing apparatus of claim 5, further comprising the non-contact temperature sensor being positioned on the housing for the induction heating element.

7. The robotic heating and mixing apparatus of claim 5 further comprising an air fan, located in the housing for the induction heating element, for cooling the induction heating element.

8. The robotic heating and mixing apparatus of claim 1 further comprising an internal mixing structure which is formed on or attached to the interior surface of the heating cavity so that the internal mixing structure projects from the interior surface of the heating cavity into the heating cavity and is carried by the heating pot in rotation with the heating pot about the longitudinal rotational axis of the heating pot.

9. The robotic heating and mixing apparatus of claim 1 further comprising:
   a stop arm which pivots with the heating pot about the secondary axis and
   a stop structure which is contacted by the stop arm when the heating pot pivots to an upwardly facing position and prevents the heating pot from pivoting past the upwardly facing position.

10. The robotic heating and mixing apparatus of claim 1 further comprising:
    a stop arm which pivots with the heating pot about the secondary axis and
    a stop structure which is contacted by the stop arm when the heating pot pivots to a downwardly facing position and prevents the heating pot from pivoting past the downwardly facing position.

11. A robotic heating and mixing apparatus for preparing a meal or entrée comprising:
    a heating pot mounted for rotating the heating pot about a longitudinal rotational axis of the heating pot;
    the heating pot having (i) a closed base end, (ii) an opening at an outer end of the heating pot through which food ingredients are received by, and delivered from, the heating pot, (iii) a side wall which extends longitudinally from the closed base end and surrounds the longitudinal rotational axis, (iv) a heating cavity within the heating pot which is surrounded by the side wall, and (v) an interior surface of the heating cavity;
    the heating pot also being mounted for pivoting the heating pot about a secondary axis between (i) a receiving orientation, (ii) a heating and mixing orientation, and (iii) a dispensing orientation;

an induction heating element which is positioned adjacent to the side wall of the heating pot at least when the heating pot is in the heating and mixing orientation;

a band of ferromagnetic metal which is provided on and surrounds the side wall of the heating pot;

a stop arm which pivots with the heating pot about the secondary axis; and a stop structure which is contacted by the stop arm when the heating pot pivots to an upwardly facing position and prevents the heating pot from pivoting past the upwardly facing position.

12. The robotic heating and mixing apparatus of claim 11 further comprising a stop structure which is contacted by the stop arm when the heating pot pivots to a downwardly facing position and prevents the heating pot from pivoting past the downwardly facing position.

13. A robotic heating and mixing apparatus for preparing a meal or entrée comprising:

a heating pot mounted for rotating the heating pot about a longitudinal rotational axis of the heating pot;

the heating pot having (i) a closed base end, (ii) an opening at an outer end of the heating pot through which food ingredients are received by, and delivered from, the heating pot, (iii) a side wall which extends longitudinally from the closed base end and surrounds the longitudinal rotational axis, (iv) a heating cavity within the heating pot which is surrounded by the side wall, and (v) an interior surface of the heating cavity;

the heating pot also being mounted for pivoting the heating pot about a secondary axis between (i) a receiving orientation, (ii) a heating and mixing orientation, and (iii) a dispensing orientation;

an induction heating element which is positioned adjacent to the side wall of the heating pot at least when the heating pot is in the heating and mixing orientation;

a band of ferromagnetic metal which is provided on and surrounds the side wall of the heating pot;

a spray element positioned to spray water and/or a cleaning agent into the heating cavity of the heating pot when the heating pot is in a downwardly facing position;

a spray activation arm which pivots with the heating pot about the secondary axis; and an activation switch which is contacted by the spray activation arm, when the heating pot pivots to the downwardly facing position, to activate the spray element to spray the water and/or the cleaning agent into the heating cavity of the heating pot when the heating pot is in the downwardly facing position.

* * * * *